Patented May 5, 1953

2,637,730

UNITED STATES PATENT OFFICE 2,637,730

MANUFACTURE OF 4,6-DIKETO HEXA-HYDROPYRIMIDINES

William R. Boon, Norman Greenhalgh, Eric London, and Charles Henry Vasey, Blackley, Manchester, England, assignors to Imperial Chemical Industries Limited, a corporation of Great Britain No Drawing. Application February 8, 1952, Serial No. 270,746. In Great Britain February 16, 1951

5 Claims. (Cl. 260—260)

This invention relates to improvements in or relating to the manufacture of new pyrimidine derivatives and more particularly it relates to a process for the manufacture of pyrimidine derivatives which possess anticonvulsant properties.

According to the invention we provide a process for the manufacture of pyrimidine derivatives of the formula

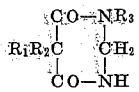

wherein $R_1$ stands for a monocyclic carbocyclic radical or for an alkenyl radical of not more than 3 carbon atoms, $R_2$ stands for an alkyl radical or an alkenyl radical of not more than 3 carbon atoms and $R_3$ stands for hydrogen or for an alkyl radical of not more than 4 carbon atoms, which comprises reacting a malondiamide derivative of the formula:

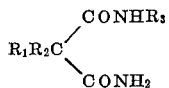

wherein $R_1$, $R_2$ and $R_3$ have the meaning set forth above, with formic acid at a temperature above 150° C.

The reaction may be brought about conveniently by heating the reactants together in solution in a solvent or diluent. Such solvent or diluent may be for example cyclohexanol, methylcyclohexanol, N-methylformamide, N-ethylformamide, dimethylformamide, formanilide, N-methylformanilide, N-phenylformanilide, nitrobenzene, dichlorobenzenes and monochloronaphthalenes.

In place of the malondiamide derivative there may be used a substance which will give rise to the malondiamide derivative in the reaction mixture. Such substances include for example the N-methylol and N-formyl derivatives of the malondiamide derivative.

Likewise in place of the formic acid there may be used a substance which will give rise to formic acid in the reaction mixture. Such substances include for example oxalic acid, and oxalic acid in the presence of glycerol.

The pyrimidine derivatives which are made according to the process of the present invention are the subject of U. S. Patent No. 2,576,279 of November 27, 1951, and are useful as anti-convulsants.

The invention is illustrated but not limited by the following examples in which the parts are by weight.

*Example 1*

11.7 parts of α:α-phenylethyl-N-ethylmalondiamide and 7 parts of 98% aqueous formic acid are heated together at 250°–260° C. for four hours while 39 parts of formic acid are added slowly. The mixture is cooled, washed with water and crystallised from aqueous methanol to give 5-phenyl - 1:5-diethyl-hexahydropyrimidine - 4:6-dione, M. P. 135-6° C.

In a similar manner there may be obtained 5-phenyl-5-methyl - hexahydropyrimidine - 4:6-dione, 5 - phenyl - 5 - ethylhexahydropyrimidine-4:6-dione, 5-phenyl-5-ethyl-1-methylhexahydropyrimidine-4:6-dione, 5-phenyl-5-ethyl-1-n-propylhexahydropyrimidine-4:6-dione and 5-phenyl-5 - ethyl - 1-n-butylhexahydropyrimidine - 4:6-dione, of M. P. 116° C. The α:α-phenylethyl-N-n-butylmalondiamide from which this last substance is obtained has M. P. 123° C. and is obtained by hydrolysis with cold concentrated sulphuric acid of α-phenyl-α-cyano-N-n-butylbutyramide of B. P. 196° C./ 16 mm.

*Example 2*

22.4 parts of α:α-phenylethylmalondiamide and 20 parts of methylcyclohexanol are heated to 180° C. and 28 parts of 85% aqueous formic acid are added during 5 hours below the surface of the mixture; heating at 180° C. is then continued for a further 4 hours. The mixture is cooled, diluted with methanol and filtered. The residue consists of 5-phenyl-5-ethylhexahydropyrimidine-4:6-dione.

Among other solvents which may be used in place of the methylcyclohexanol in this example there may be mentioned N-methylformamide, N-ethylformamide, dimethylformamide, formanilide, N-methylformanilide, N-phenylformanilide, nitrobenzene, dichlorobenzenes and monochloronaphthalenes.

*Example 3*

To 22.4 parts of α:α-phenylethylmalondiamide, heated to 190° C., 27 parts of oxalic acid are added during 15 minutes, heating then being continued for 9 hours. The mixture is cooled and diluted with 25 parts of methanol and filtered. 5 - phenyl - 5 - ethylhexahydropyrimidine - 4:6-dione is obtained as the solid residue.

*Example 4*

5 parts of the N:N'-dimethylol derivative of $a:a$-phenylethylmalondiamide are dissolved in 150 parts of dimethylformamide and the solution is heated under reflux. 6 parts of 98% aqueous formic acid are then added to the mixture at the rate of 1 part every 30 minutes. 100 parts of dimethylformamide are then distilled from the mixture which is then cooled and filtered. The solid residue consists of 5-phenyl-5-ethylhexahydropyrimidine-4:6-dione.

The N:N'-dimethylol derivative of $a:a$-phenylethyl-malondiamide, M. P. 191° C. may be obtained by warming an aqueous suspension of $a:a$-phenylethyl-malondiamide with rather more than two molecular proportions of formaldehyde in presence of a small quantity of potassium carbonate.

*Example 5*

2 parts of $a:a$-phenylethyl-N-formylmalondiamide, 150 parts of dimethylformamide and 10 parts of 98% aqueous formic acid are heated together at 180° C. for two hours, during which time a further 40 parts of formic acid are added. The mixture is distilled to small volume and cooled and filtered. The solid residue consists of 5-phenyl-5-ethylhexahydropyrimidine-4:6-dione.

The $a:a$-phenylethylformylmalondiamide, M. P. 170° C., may be obtained by oxidation with chromic acid of the N:N'-dimethylol derivative of $a:a$-phenylethylmalondiamide.

What we claim is:

1. Process for the manufacture of pyrimidine derivatives of the formula:

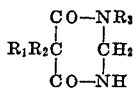

wherein $R_1$ represents a radical selected from the group consisting of monocyclic carbocyclic radicals and alkenyl radicals of from 1 to 3 carbon atoms, $R_2$ represents a radical selected from the group consisting of alkyl radicals and alkenyl radicals of from 1 to 3 carbon atoms, and $R_3$ represents a radical selected from the group consisting of hydrogen and alkyl radicals of from 1 to 4 carbon atoms, which comprises reacting a malondiamide derivative of the formula:

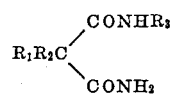

wherein $R_1$, $R_2$ and $R_3$ have the meaning set forth above, with formic acid at a temperature above 150° C. and below the decomposition temperatures of the reactants and resulting reaction products.

2. The process of claim 1, wherein the reaction is brought about by heating the reactants together in solution in a liquid vehicle.

3. The process of claim 1, wherein the malondiamide derivative is formed in situ by using a substance selected from the group consisting of the N-methylol and the N-formyl derivatives of the malondiamide derivative.

4. The process of claim 1, wherein the formic acid is formed in situ by using oxalic acid.

5. The process of claim 4, wherein the oxalic acid is used in the presence of glycerol.

WILLIAM R. BOON.
NORMAN GREENHALGH.
ERIC LONDON.
CHARLES HENRY VASEY.

References Cited in the file of this patent

UNITED STATES PATENTS

| Number | Name | Date |
|---|---|---|
| 2,578,847 | Boon et al. | Dec. 18, 1951 |